US010648391B2

(12) United States Patent
Ono et al.

(10) Patent No.: US 10,648,391 B2
(45) Date of Patent: May 12, 2020

(54) ABNORMALITY DIAGNOSIS SYSTEM FOR AN EXHAUST GAS PURIFICATION APPARATUS

(71) Applicant: TOYOTA JIDOSHA KABUSHIKI KAISHA, Toyota-shi (JP)

(72) Inventors: Ryohei Ono, Susono (JP); Masaaki Sato, Susono (JP); Katsuhiro Ito, Mishima (JP); Akira Mikami, Mishima (JP); Kazuhiro Umemoto, Ebina (JP); Daichi Imai, Sunto-gun (JP)

(73) Assignee: TOYOTA JIDOSHA KABUSHIKI KAISHA, Toyota-shi (JP)

(*) Notice: Subject to any disclaimer, the term of this patent is extended or adjusted under 35 U.S.C. 154(b) by 1 day.

(21) Appl. No.: 16/221,684

(22) Filed: Dec. 17, 2018

(65) Prior Publication Data

US 2019/0195114 A1   Jun. 27, 2019

(30) Foreign Application Priority Data

Dec. 27, 2017   (JP) .................................. 2017-251329

(51) Int. Cl.
*F01N 11/00*   (2006.01)
*F01N 3/20*   (2006.01)

(52) U.S. Cl.
CPC .......... *F01N 11/007* (2013.01); *F01N 3/2066* (2013.01); *F01N 11/00* (2013.01); *F01N 11/002* (2013.01); *F01N 2550/02* (2013.01); *F01N 2550/03* (2013.01); *F01N 2560/021* (2013.01); *F01N 2610/02* (2013.01); *F01N 2900/1602* (2013.01); *F01N 2900/1616* (2013.01); *F01N 2900/1622* (2013.01)

(58) Field of Classification Search
CPC ...... F01N 11/00; F01N 11/002; F01N 11/007; F01N 3/2066; F01N 2550/02; F01N 2550/03; F01N 2560/021; F01N 2610/02; F01N 2900/1602; F01N 2900/1616; F01N 2900/1622
See application file for complete search history.

(56) References Cited

U.S. PATENT DOCUMENTS

2010/0257844 A1* 10/2010 Shimomura ............ F01N 3/208
60/277

FOREIGN PATENT DOCUMENTS

JP        2013-227930        11/2013

* cited by examiner

*Primary Examiner* — Brandon D Lee
(74) *Attorney, Agent, or Firm* — Oblon, McClelland, Maier & Neustadt, L.L.P.

(57) ABSTRACT

A controller estimates a first estimated adsorption amount which is an amount of adsorption of ammonia in the SCR catalyst at the time when the SCR catalyst is assumed to be in a predetermined abnormal state, estimates a second estimated adsorption amount at the time when the SCR catalyst is assumed to be in a predetermined normal state, calculates a first slip development temperature based on the first estimated adsorption amount, and calculates a second slip development temperature based on the second estimated adsorption amount. The controller, when carrying out an abnormality diagnosis based on a concentration of ammonia in an exhaust gas at the downstream side of the SCR catalyst, carries out diagnostic temperature control so as to control the temperature of the SCR catalyst to a temperature which is equal to or more than the first slip development temperature and is less than the second slip development temperature.

1 Claim, 4 Drawing Sheets

ABNORMALITY DIAGNOSIS SYSTEM FOR AN EXHAUST GAS PURIFICATION APPARATUS

This application claims the benefit of Japanese Patent Application No. 2017-251329, filed on Dec. 27, 2017, which is hereby incorporated by reference herein in its entirety.

BACKGROUND

Technical Field

The present disclosure relates to an abnormality diagnosis system for an exhaust gas purification apparatus.

Description of the Related Art

There has been known a technique in which an NOx selective reduction catalyst (hereinafter, sometimes also referred to simply as an "SCR catalyst") for reducing NOx contained in an exhaust gas from an internal combustion engine by using ammonia as a reducing agent is arranged in an exhaust passage of the internal combustion engine as an exhaust gas purification catalyst. In the case where the SCR catalyst is arranged in the exhaust passage, an ammonia supply device is arranged in the exhaust passage at the upstream side of the SCR catalyst. The ammonia supply device serves to supply ammonia to the SCR catalyst by adding ammonia or a precursor of ammonia into an ex In addition, in patent literature 1, there is described a technique of making an abnormality diagnosis of an SCR catalyst based on a detected value of an ammonia sensor arranged in an exhaust passage at the downstream side of the SCR catalyst. More specifically, in this technique described in the patent literature 1, a slip ratio of ammonia, which is a ratio of an amount of ammonia slipped from the SCR catalyst to an amount of ammonia supplied to the SCR catalyst, is calculated based on the detected value of the ammonia sensor. Then, in cases where the slip ratio of ammonia thus calculated is equal to or larger than a threshold value, a determination is made that the SCR catalyst has deteriorated.

CITATION LIST

Patent Literature

Patent Literature 1: Japanese patent application laid-open publication No. 2013-227930

SUMMARY

In the above-mentioned conventional technique, an abnormality diagnosis of the SCR catalyst is carried out by using the tendency that in cases where abnormality has occurred in the SCR catalyst, ammonia becomes easy to slip from the SCR catalyst. However, depending on the construction of the exhaust gas purification apparatus, the operating state of the internal combustion engine, etc., a situation may arise in which even if abnormality has occurred in the SCR catalyst, ammonia does not slip from the SCR catalyst because an amount of adsorption of ammonia adsorbed to the SCR catalyst is small when an execution condition for the abnormality diagnosis is satisfied. In other words, in order to carry out the abnormality diagnosis of the SCR catalyst by detecting the ammonia slipped from the SCR catalyst, it is necessary for a suitable amount of ammonia to be adsorbed to the SCR catalyst when carrying out the abnormality diagnosis. However, the amount of adsorption of ammonia in the SCR catalyst may not necessarily become a suitable amount for the abnormality diagnosis at timing when the execution of the abnormality diagnosis of the SCR catalyst is required. In such a case, it may become difficult to ensure an opportunity for the execution of the abnormality diagnosis of the SCR catalyst.

The present disclosure has been made in view of the problems as referred to above, and has for its object to ensure an opportunity for the execution of an abnormality diagnosis of an SCR catalyst in an appropriate manner.

An abnormality diagnosis system for an exhaust gas purification apparatus according to the present disclosure is applied to an exhaust gas purification apparatus which includes: an NOx selective reduction catalyst that is arranged in an exhaust passage of the internal combustion engine and reduces NOx in an exhaust gas by using ammonia as a reducing agent; and an ammonia supply device that is arranged in the exhaust passage at the upstream side of the NOx selective reduction catalyst, and supplies ammonia to the NOx selective reduction catalyst. The abnormality diagnosis system may comprise: an ammonia sensor that detects a concentration of ammonia in the exhaust gas at the downstream side of the NOx selective reduction catalyst; and a controller comprising at least one processor configured to carry out an abnormality diagnosis of the NOx selective reduction catalyst, wherein the controller estimates a first estimated adsorption amount which is an amount of adsorption of ammonia in the NOx selective reduction catalyst at the time when the NOx selective reduction catalyst is assumed to be in a predetermined abnormal state; estimates a second estimated adsorption amount which is an amount of adsorption of ammonia in the NOx selective reduction catalyst at the time when the NOx selective reduction catalyst is assumed to be in a predetermined normal state; calculates, based on the first estimated adsorption amount, a first slip development temperature which is a temperature of the NOx selective reduction catalyst at which ammonia begins to slip from the NOx selective reduction catalyst in the case where the NOx selective reduction catalyst is in the predetermined abnormal state; calculates, based on the second estimated adsorption amount, a second slip development temperature which is a temperature of the NOx selective reduction catalyst at which ammonia begins to slip from the NOx selective reduction catalyst in the case where the NOx selective reduction catalyst is in the predetermined normal state; carries out diagnostic temperature control to control the temperature of the NOx selective reduction catalyst to a temperature which is equal to or higher than the first slip development temperature and is less than the second slip development temperature, at the time of carrying out the abnormality diagnosis of the NOx selective reduction catalyst; and carries out the abnormality diagnosis of the NOx selective reduction catalyst based on the concentration of ammonia detected by the ammonia sensor when the diagnostic temperature control is carried out.

In the abnormality diagnosis system according to the present disclosure, the first estimated adsorption amount may be estimated by the controller, and the second estimated adsorption amount is estimated by the controller. Here, the first estimated adsorption amount is an amount of adsorption of ammonia in the SCR catalyst at the time of assuming that the SCR catalyst is in the predetermined abnormal state (i.e., a state in which it should be diagnosed that abnormality has occurred in the SCR catalyst, in the abnormality diagnosis). In addition, the second estimated adsorption amount is an amount of adsorption of ammonia in the SCR catalyst at the time of assuming that the SCR catalyst is in the normal state (i.e., a state in which it should be diagnosed that the SCR catalyst is normal, in the abnormality diagnosis).

An upper limit adsorption amount (an amount of saturated adsorption) of ammonia in the SCR catalyst decreases, when the temperature of the SCR catalyst goes up. For that reason, when the temperature of the SCR catalyst goes up in a state where ammonia is adsorbed to the SCR catalyst, a slip of ammonia occurs in which ammonia flows out from the SCR catalyst. Then, when abnormality occurs in the SCR catalyst, the slip of ammonia occurs in a state where the temperature of the SCR catalyst is lower in comparison with the case when the SCR catalyst is normal.

Accordingly, in the present disclosure, the controller may calculate, based on the first estimated adsorption amount, the first slip development temperature which is the temperature of the SCR catalyst at which ammonia begins to slip from the SCR catalyst in cases where the SCR catalyst is in the predetermined abnormal state. In other words, the first slip development temperature calculated by the controller may be the temperature of the SCR catalyst at which the slip of ammonia begins to occur, in cases where the SCR catalyst is in the predetermined abnormal state and the amount of adsorbed ammonia in the SCR catalyst is the first estimated adsorption amount at the current point in time. In addition, the controller may calculate, based on the second estimated adsorption amount, the second slip development temperature which is the temperature of the SCR catalyst at which ammonia begins to slip from the SCR catalyst in cases where the SCR catalyst is in the predetermined normal state. In other words, the second slip development temperature calculated by the controller may be the temperature of the SCR catalyst at which the slip of ammonia begins to occur, in cases where the SCR catalyst is in the predetermined normal state and the amount of adsorbed ammonia in the SCR catalyst is the second estimated adsorption amount at the current point in time. Then, in cases where the first slip development temperature and the second slip development temperature are calculated in this manner, the first slip development temperature becomes lower than the second slip development temperature.

Then, in the present disclosure, when carrying out the abnormality diagnosis of the SCR catalyst, the diagnostic temperature control to control the temperature of the SCR catalyst to a temperature which is equal to or more than the first slip development temperature and which is less than the second slip development temperature may be carried out by the controller.

When the diagnostic temperature control as mentioned above is carried out, ammonia will not slip from the SCR catalyst in the case where the actual state of the SCR catalyst is normal, but ammonia will slip from the SCR catalyst in the case where it is abnormal. Then, if ammonia slips from the SCR catalyst, the ammonia thus slipped will be detected by the ammonia sensor. For that reason, by carrying out the diagnostic temperature control, it becomes possible for the controller to carry out the abnormality diagnosis of the SCR catalyst based on the concentration of ammonia detected by the ammonia sensor.

Accordingly, according to the present disclosure, by carrying out the diagnostic temperature control, it becomes possible to carry out the abnormality diagnosis of the SCR catalyst irrespective of the actual amount of adsorption of ammonia in the SCR catalyst. For that reason, it is possible to ensure an opportunity for the execution of the abnormality diagnosis of the SCR catalyst in an appropriate manner.

According to the present disclosure, it is possible to ensure an opportunity for the execution of the abnormality diagnosis of the SCR catalyst in an appropriate manner.

DESCRIPTION OF THE EMBODIMENTS

Hereinafter, a specific mode or embodiment of the present disclosure will be described based on the attached drawings. However, the dimensions, materials, shapes, relative arrangements and so on of component parts described in the embodiment are not intended to limit the technical scope of the present disclosure to these alone in particular as long as there are no specific statements.

Embodiment (Schematic Construction)

Figure 1:
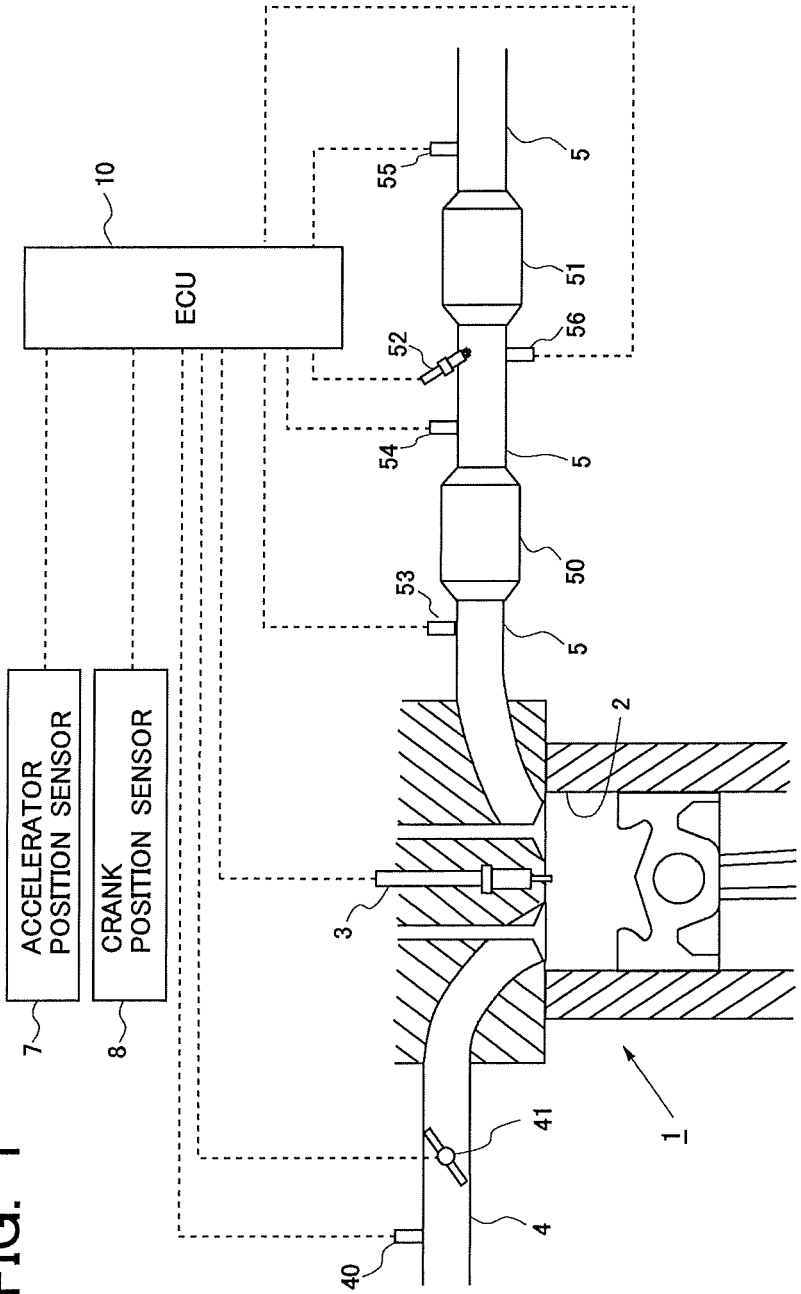
FIG. 1 is a view indicating the schematic construction of an internal combustion engine and its intake and exhaust systems according to an embodiment.

FIG. 1 is a view indicating the schematic construction of an internal combustion engine and its intake and exhaust systems according to an embodiment of the present disclosure. The internal combustion engine 1 indicated in FIG. 1 is an internal combustion engine of compression ignition type (diesel engine). However, the present disclosure can also be applied to a lean burn internal combustion engine of spark ignition type which uses gasoline or the like as fuel.

The internal combustion engine 1 is provided with a fuel injection valve 3 for injecting fuel into a cylinder 2. Here, note that in cases where the internal combustion engine 1 is an internal combustion engine of spark ignition type, the fuel injection valve 3 may be constructed such that fuel is injected to an intake port.

The internal combustion engine 1 is connected to an intake passage 4. In the intake passage 4, there are arranged an air flow meter 40 and a throttle valve 41. The air flow meter 40 outputs an electrical signal corresponding to an amount (mass) of intake air (air) flowing in the intake passage 4. The throttle valve 41 is arranged in the intake passage 4 at the downstream side of the air flow meter 40. The throttle valve 41 serves to adjust the amount of intake air in the internal combustion engine 1 by changing the channel cross section of the intake passage 4.

The internal combustion engine 1 is connected to an exhaust passage 5. In the exhaust passage 5, there are arranged a first NOx sensor 53, an NOx storage reduction catalyst 50 (hereinafter, sometimes also referred to as an "NSR catalyst 50"), a second NOx sensor 54, a urea water addition valve 52, a temperature sensor 56, an NOx selective reduction catalyst 51 (hereinafter, sometimes also referred to as an SCR catalyst 51) and an ammonia sensor 55 sequentially according to the flow of exhaust gas. The NSR catalyst 50 stores or adsorbs NOx contained in the exhaust gas when the air fuel ratio of the exhaust gas is a lean air fuel ratio higher than a stoichiometric air fuel ratio, whereas the NSR catalyst 50 releases the NOx stored or adsorbed therein when the air fuel ratio of the exhaust gas is a rich air fuel ratio lower than the stoichiometric air fuel ratio, and at the same time, promotes reaction between the NOx thus released and reducing components (e.g., hydrocarbon (HC), carbon monoxide (CO), etc.) in the exhaust gas. The SCR catalyst 51 has a function to reduce the NOx in the exhaust gas by using ammonia as a reducing agent. Here, the urea water addition valve 52 arranged at the upstream side of the SCR catalyst 51 serves to add urea water into the exhaust gas flowing in the exhaust passage 5. When the urea water is added from the urea water addition valve 52, ammonia is produced by hydrolysis of the urea contained in the urea water. As a result of this, ammonia as the reducing agent is supplied to the SCR catalyst 51. The ammonia thus supplied to the SCR catalyst 51 is adsorbed to the SCR catalyst 51. Then, in the SCR catalyst 51, the NOx in the exhaust gas is reduced by using, as the reducing agent, the ammonia thus adsorbed. Here, note that in this embodiment, the urea water addition valve 52 corresponds to an "ammonia supply device" according to the present disclosure. In addition, in place of the urea water addition valve 52, there may be arranged an ammonia addition valve that serves to add ammonia gas into the exhaust gas. In this case, the ammonia addition valve corresponds to the "ammonia supply device" according to the present disclosure.

In addition, the temperature sensor 56 outputs an electrical signal corresponding to the temperature of the exhaust gas. Moreover, the first NOx sensor 53 and the second NOx sensor 54 are each a sensor for detecting the concentration of NOx in the exhaust gas. In other words, each of the NOx sensors 53, 54 outputs an electrical signal corresponding to the concentration of NOx in the exhaust gas. Further, the ammonia sensor 55 is a sensor for detecting the concentration of ammonia in the exhaust gas. In other words, the ammonia sensor 55 outputs an electrical signal corresponding to the concentration of ammonia in the exhaust gas.

Then, an electronic control unit (ECU) 10 is provided in combination with the internal combustion engine 1. This ECU 10 is a unit that controls the operating state of the internal combustion engine 1, etc. A variety of kinds of sensors such as an accelerator position sensor 7, a crank position sensor 8, etc., in addition to the air flow meter 40, the first NOx sensor 53, the second NOx sensor 54, the ammonia sensor 55, the temperature sensor 56 as mentioned above, are electrically connected to the ECU 10. The accelerator position sensor 7 is a sensor which outputs an electrical signal correlated with an amount of operation (accelerator opening) of an unillustrated accelerator pedal. The crank position sensor 8 is a sensor which outputs an electrical signal correlated with a rotational position of an engine output shaft (crankshaft) of the internal combustion engine 1. Then, the output signals of these sensors are inputted to the ECU 10. The ECU 10 derives the engine load of the internal combustion engine 1 based on the output signal of the accelerator position sensor 7, and also derives the engine rotational speed of the internal combustion engine 1 based on the output value of the crank position sensor 8.

Further, the ECU 10 estimates the flow rate of the exhaust gas flowing into the SCR catalyst 51 (hereinafter, sometimes referred to as the "flow rate of the exhaust gas") based on the output value of the air flow meter 40. In addition, the ECU 10 estimates the temperature of the SCR catalyst 51 (hereinafter, sometimes also referred to as the "SCR temperature") based on the output value of the temperature sensor 56. Here, in FIG. 1, the temperature sensor 56 is arranged in the exhaust passage 5 between the NSR catalyst 50 and the SCR catalyst 51, but the temperature sensor 56 may be arranged at the downstream side of the SCR catalyst 51. Then, in cases where the temperature sensor 56 is arranged of the downstream side of the SCR catalyst 51, too, the ECU 10 can estimate the SCR catalyst temperature based on the output value of the temperature sensor 56. Moreover, a variety of kinds of devices such as the fuel injection valve 3, the throttle valve 41, the urea water addition valve 52 and so on are electrically connected to the ECU 10. Thus, these variety of kinds of devices are controlled by the ECU 10.

(Abnormality Diagnosis for SCR Catalyst)

Next, abnormal diagnosis of the SCR catalyst 51 will be explained. In general, when abnormality occurs in the SCR catalyst 51, an NOx reduction rate by the SCR catalyst 51 (a ratio of the amount of NOx reduced in the SCR catalyst 51 with respect to the amount of NOx flowing into the SCR catalyst 51) becomes lower, in comparison with when the SCR catalyst 51 is normal. For that reason, it is considered that abnormality diagnosis of the SCR catalyst 51 is carried out based on the NOx reduction rate by the SCR catalyst 51. However, in this embodiment, as indicated in FIG. 1, the NSR catalyst 50 is arranged in the exhaust passage 5 at the upstream side of the SCR catalyst 51. For that reason first, most of the NOx discharged from the internal combustion engine 1 is stored into the NSR catalyst 50. Accordingly, in the normal case, the flow rate of NOx flowing into the SCR catalyst 51 (the inflow amount of NOx) becomes a relatively small amount. Then, when the inflow amount of NOx is relatively small, a difference in the NOx reduction rate is hard to develop between the case where abnormality has occurred in the SCR catalyst 51, and the case where the SCR catalyst 51 is normal. For that reason, when abnormality diagnosis of the SCR catalyst 51 is carried out based on the NOx reduction rate, there is a fear that accurate diagnosis can not be made.

Accordingly, in this embodiment, the abnormality diagnosis of the SCR catalyst 51 is carried out based on a concentration of ammonia in the exhaust gas at the downstream side of the SCR catalyst 51 at the time when ammonia is supplied to the SCR catalyst 51. Here, an upper limit adsorption amount (an amount of saturated adsorption) of ammonia in the SCR catalyst 51 decreases as the SCR temperature goes up. For that reason, when the upper limit adsorption amount of ammonia in the SCR catalyst 51 becomes lower than the amount of adsorbed ammonia in the SCR catalyst 51 at the current point in time due to the rise of the SCR temperature in a state where ammonia has been adsorbed to the SCR catalyst 51, there occurs a slip of ammonia in which ammonia slips from the SCR catalyst 51.

In addition, when abnormality occurs in the SCR catalyst 51, the slip of ammonia from the SCR catalyst 51 begins to occur in a state where the amount of adsorption of ammonia in the SCR catalyst 51 is smaller and in a state where the SCR temperature is lower, in comparison with when the SCR catalyst 51 is normal. Accordingly, in this embodiment, the ECU 10 estimates a first estimated adsorption amount and a second estimated adsorption amount, respectively. Here, the first estimated adsorption amount is an amount of adsorption of ammonia in the SCR catalyst 51 when it is assumed that the SCR catalyst 51 is in the predetermined abnormal state. Also, the second estimated adsorption amount is an amount of adsorption of ammonia in the SCR catalyst 51 when it is assumed that the SCR catalyst 51 is in the normal state.

Moreover, the ECU 10 calculates a first slip development temperature based on the first estimated adsorption amount. Here, the first slip development temperature is an SCR temperature at which ammonia begins to slip from the SCR catalyst 51 in the case where the SCR catalyst 51 is in the predetermined abnormal state. In other words, the first slip development temperature calculated by the ECU 10 is the SCR temperature at which the slip of ammonia begins to occur, in cases where the SCR catalyst 51 is in the predetermined abnormal state and the amount of adsorbed ammonia in the SCR catalyst is the first estimated adsorption amount at the current point in time. In addition, the ECU 10 calculates a second slip development temperature based on the second estimated adsorption amount. Here, the second slip development temperature is an SCR temperature at which ammonia begins to slip from the SCR catalyst 51 in the case where the SCR catalyst 51 is in the predetermined normal state. In other words, the second slip development temperature calculated by the ECU 10 is the SCR temperature at which the slip of ammonia begins to occur, in cases where the SCR catalyst 51 is in the predetermined normal state and the amount of adsorbed ammonia in the SCR catalyst 51 is the second estimated adsorption amount at the current point in time. At this time, the first slip development temperature becomes lower than the second slip development temperature. Then, when carrying out the abnormality diagnosis of the SCR catalyst 51, the diagnostic temperature control is carried out so as to control the SCR temperature to a temperature which is equal to or more than the first slip development temperature and which is less than the second slip development temperature.

Figure 2:
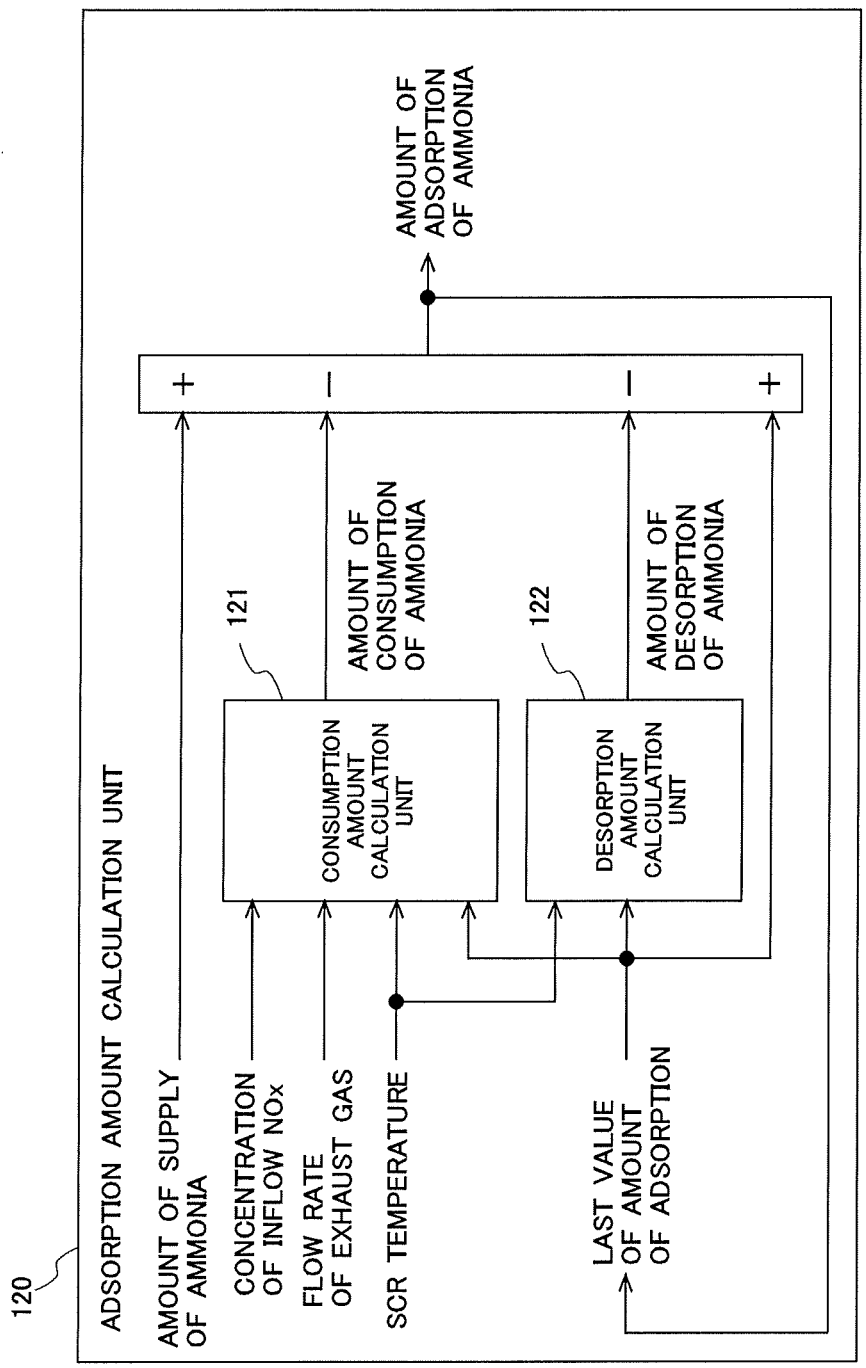
FIG. 2 is a block diagram indicating a function of an adsorption amount calculation unit in an ECU.

Here, a specific example of a method for calculating the amount of adsorption of ammonia in the SCR catalyst 51 according to this embodiment will be explained based on FIG. 2. FIG. 2 is a block diagram indicating a function of an adsorption amount calculation unit 120 in the ECU 10. The adsorption amount calculation unit 120 is a functional unit for calculating the amount of adsorption of ammonia in the SCR catalyst 51, and is achieved by executing a predetermined program in the ECU 10.

In the adsorption amount calculation unit 120, a current amount of adsorbed ammonia is calculated by integrating an amount of supply of ammonia which is an amount of ammonia supplied to the SCR catalyst 51, an amount of consumption of ammonia which is an amount of ammonia consumed for the reduction of NOx in the SCR catalyst 51, and an amount of desorption of ammonia which is an amount of ammonia to desorb from the SCR catalyst 51. Specifically, the adsorption amount calculation unit 120 has a consumption amount calculation unit 121 and a desorption amount calculation unit 122. The consumption amount calculation unit 121 calculates, as the amount of consumption of ammonia, an amount of ammonia consumed for the reduction of NOx in the SCR catalyst 51 during a predetermined period of time corresponding to an operation (calculation) period of the amount of adsorbed ammonia. The desorption amount calculation unit 122 calculates, as the amount of desorption of ammonia, an amount of ammonia to desorb from the SCR catalyst during the predetermined period of time. In addition, in the adsorption amount calculation unit 120, an amount of ammonia supplied to the SCR catalyst 51 during the predetermined period of time is estimated as the amount of supply of ammonia. As mentioned above, the ammonia supplied to the SCR catalyst 51 is produced by hydrolysis of the urea contained in the urea water added from the urea water addition valve 52. For that reason, the amount of supply of ammonia can be estimated based on the amount of urea water added from the urea water addition valve 52 during the predetermined period of time.

In addition, a concentration of NOx in the exhaust gas flowing into the SCR catalyst 51 (a concentration of inflow NOx), the flow rate of the exhaust gas, the SCR temperature, and an amount of adsorption of ammonia in the SCR catalyst 51 calculated by the last calculation (the last value of the amount of adsorption) are inputted into the consumption amount calculation unit 121. Here, note that the concentration of inflow NOx is detected by the second NOx sensor 54. Here, the NOx reduction rate in the SCR catalyst 51 has a correlation with the flow rate of the exhaust gas, the SCR temperature, and the amount of adsorption of ammonia in the SCR catalyst 51. Accordingly, in the consumption amount calculation unit 121, an NOx reduction rate, which is estimated to be exhibited by the SCR catalyst 51 at the current point in time (hereinafter, referred to as an "estimated NOx reduction rate"), is calculated based on the flow rate of the exhaust gas, the SCR temperature, and the last value of the amount of adsorption thus inputted. Further, in the consumption amount calculation unit 121, an amount of NOx flowing into the SCR catalyst 51 in the predetermined period of time (hereinafter, referred to as an "inflow amount of NOx") is calculated based on the concentration of inflow NOx and the flow rate of the exhaust gas thus inputted. Then, the amount of consumption of ammonia is calculated based on the estimated NOx reduction rate and the inflow amount of NOx thus calculated. On the other hand, the SCR temperature and the last value of the amount of adsorption are inputted to the desorption amount calculation unit 122. Then, the amount of desorption of ammonia is calculated based on the SCR temperature and the last value of the amount of adsorption thus inputted.

Then, in cases where the first estimated adsorption amount is calculated in the adsorption amount calculation unit 120, the consumption amount calculation unit 121 and the desorption amount calculation unit 122 calculate the amount of consumption of ammonia and the amount of desorption of ammonia, assuming that the SCR catalyst 51 is in the predetermined abnormal state. In addition, in cases where the second estimated adsorption amount is calculated in the adsorption amount calculation unit 120, the consumption amount calculation unit 121 and the desorption amount calculation unit 122 calculate the amount of consumption of ammonia and the amount of desorption of ammonia, assuming that the SCR catalyst 51 is in the predetermined normal state. For example, as maps each indicating a correlation of the flow rate of exhaust gas, the SCR temperature, and the last value of the amount of adsorption with the estimated NOx reduction rate, the consumption amount calculation unit 121 may have two maps including a map in the case of assuming that the SCR catalyst 51 is in the predetermined abnormal state, and a map in the case of assuming that the SCR catalyst 51 is in the predetermined normal state. In this case, by using the respective maps, the consumption amount calculation unit 121 calculates an estimated NOx reduction rate at the time of assuming that the SCR catalyst 51 is in the predetermined abnormal state, and an estimated NOx reduction rate at the time of assuming that the SCR catalyst 51 is in the predetermined normal state, respectively. Moreover, the consumption amount calculation unit 121 calculates, based on the estimated NOx reduction rates and the inflow amounts of NOx thus calculated in the respective cases, an amount of consumption of ammonia at the time of assuming that the SCR catalyst 51 is in the predetermined abnormal state, and an amount of consumption of ammonia at the time of assuming that the SCR catalyst 51 is in the predetermined normal state. Further, as maps each indicating a correlation of the SCR temperature and the last value of the amount of adsorption with the amount of desorption of ammonia, the desorption amount calculation unit 122 may have two maps including a map in the case of assuming that the SCR catalyst 51 is in the predetermined abnormal state, and a map in the case of assuming that the SCR catalyst 51 is in the predetermined normal state. In this case, by using the respective maps, the desorption amount calculation unit 122 calculates an amount of desorption of ammonia at the time of assuming that the SCR catalyst 51 is in the predetermined abnormal state, and an amount of desorption of ammonia at the time of assuming that the SCR catalyst 51 is in the predetermined normal state. Then, the first estimated adsorption amount is calculated by adding the amount of consumption of ammonia and the amount of desorption of ammonia calculated assuming that the SCR catalyst 51 is in the predetermined abnormal state as mentioned above, and the amount of supply of ammonia. Also, the second estimated adsorption amount is calculated by adding the amount of consumption of ammonia and the amount of desorption of ammonia calculated assuming that the SCR catalyst 51 is in the predetermined normal state as mentioned above, and the amount of supply of ammonia.

However, the estimation method of the first estimated adsorption amount and the second estimated adsorption amount is not limited to the above-mentioned method, but may adopt other well-known techniques.

Figure 3:
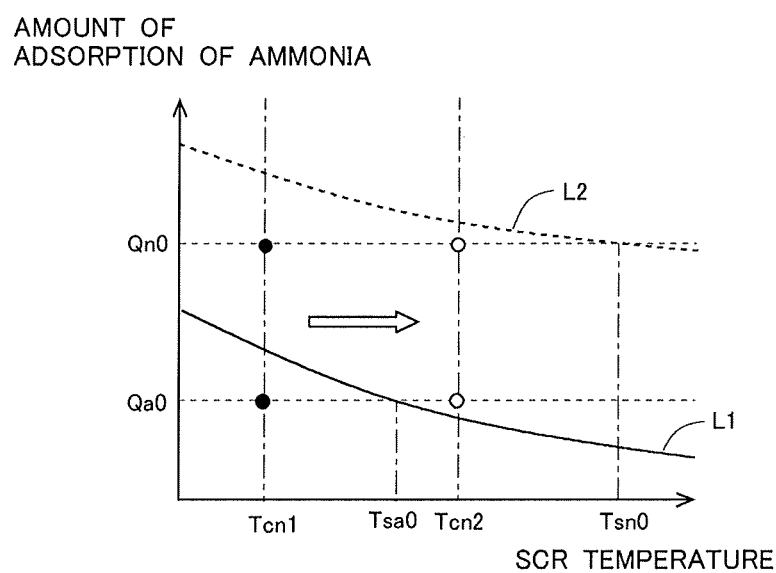
FIG. 3 is a view indicating a correlation of a first slip development temperature and a second slip development temperature, with an amount of adsorption of ammonia in an SCR catalyst.

Next, the change over time of the SCR temperature at the time of carrying out the diagnostic temperature control will be explained. FIG. 3 is a view indicating a correlation of the first slip development temperature and the second slip development temperature, with the amount of adsorption of ammonia in the SCR catalyst 51. In FIG. 3, the axis of ordinate represents the amount of adsorption of ammonia in the SCR catalyst 51, and the axis of abscissa represents the SCR temperature. In addition, in FIG. 3, a solid line L1 indicates a correlation between the first estimated adsorption amount and the first slip development temperature, and a broken line L2 indicates a correlation between the second estimated adsorption amount and the second slip development temperature. Here, note that when the SCR temperature is the same, the amount of adsorption of ammonia in the SCR catalyst 51 at which the slip of ammonia begins to occur becomes smaller in the case where the SCR catalyst 51 is abnormal than in the case where the SCR catalyst 51 is normal, as indicated in FIG. 3.

Here, supposing that the first estimated adsorption amount estimated by the ECU 10 is Qa0, the first slip development temperature becomes Tsa0. In addition, supposing that the second estimated adsorption amount estimated by the ECU 10 is Qn0, the second slip development temperature becomes Tsa0. Then, at this time, supposing that the SCR temperature at the current point in time is Tcn1, as indicated by black circles in FIG. 3, the SCR temperature will be lower than the second slip development temperature Tsn0, and further will be lower than the first slip development temperature Tsa0. In this case, even if abnormality has occurred in the SCR catalyst 51, the slip of ammonia from the SCR catalyst 51 is hard to occur. For that reason, under such a situation, it is difficult to carry out abnormality diagnosis of the SCR catalyst 51 based on the concentration of ammonia at the downstream side of the SCR catalyst 51 in an accurate manner.

Accordingly, in this embodiment, when carrying out the abnormality diagnosis of the SCR catalyst 51, the temperature of the SCR catalyst 51 is raised by carrying out the diagnostic temperature control. Here, in the internal combustion engine 1, the diagnostic temperature control is achieved by carrying out auxiliary fuel injection in an auxiliary fuel injection period which is after a main fuel injection period, and in which at least a part of injected fuel is discharged from the internal combustion engine 1 together with exhaust gas without being used for combustion. When unburnt fuel components are discharged from the internal combustion engine 1 by the execution of the auxiliary fuel injection, the unburnt fuel components will be oxidized in the NSR catalyst 50. With the heat of oxidation generated by oxidation of these unburnt fuel components, the temperature of the exhaust gas flowing into the SCR catalyst 51 goes up, and the SCR temperature accordingly goes up. Here, note that the diagnostic temperature control may be achieved by the control to raise the temperature of the exhaust gas discharged from the internal combustion engine 1. In addition, an electric heater for heating the exhaust gas flowing into the SCR catalyst 51 or heating the NSR catalyst 50 or the SCR catalyst 51 itself may be newly arranged, so that the diagnostic temperature control may be achieved by heating of the electric heater.

When the SCR temperature becomes Tcn2 by carrying out the diagnostic temperature control, as indicated by white circles in FIG. 3, the SCR temperature will be equal to or more than the first slip development temperature Tsa0 and lower than the second slip development temperature Tsn0. In that case, if abnormality has occurred in the SCR catalyst 51, ammonia will slip from the SCR catalyst 51. However, at this time, when the SCR temperature rises up to the second slip development temperature TsnO or above, ammonia will slip from the SCR catalyst 51, even if the SCR catalyst 51 is in the normal state. Thus, in cases where such a situation has occurred, too, it becomes difficult to carry out the abnormality diagnosis of the SCR catalyst 51 based on the concentration of ammonia at the downstream side of the SCR catalyst 51 in an accurate manner.

Accordingly, in the diagnostic temperature control, the SCR temperature is controlled to a temperature which is equal to or more than the first slip development temperature and is less than the second slip development temperature. By carrying out such diagnostic temperature control, the SCR temperature can be controlled to a temperature at which ammonia slips from the SCR catalyst 51 when abnormality has occurred in the SCR catalyst 51, but ammonia does not slip from the SCR catalyst 51 when the SCR catalyst 51 is in the normal state. As a result, it becomes possible to carry out abnormality diagnosis of the SCR catalyst 51 based on the concentration of ammonia at the downstream side of the SCR catalyst 51 in an accurate manner.

(Abnormality Diagnosis Flow)

Figure 4:
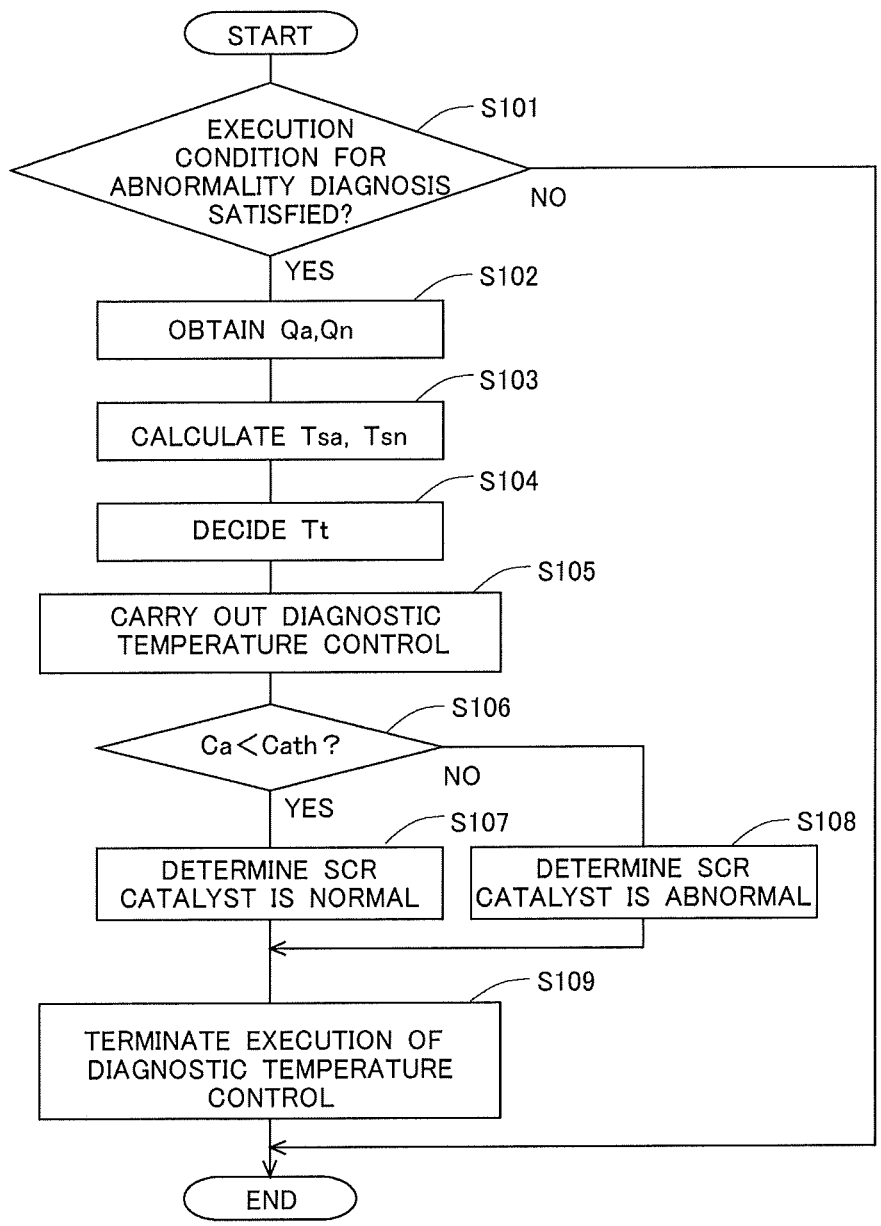
FIG. 4 is a flow chart indicating a flow of an abnormality diagnosis of the SCR catalyst according to this embodiment.

Here, a flow or routine for abnormality diagnosis of the SCR catalyst according to this embodiment will be explained based on FIG. 4. FIG. 4 is a flow chart indicating the flow or routine for abnormality diagnosis of the SCR catalyst according to this embodiment. In this embodiment, this routine is carried out at a predetermined interval in a repeated manner by the ECU 10 during the operation of the internal combustion engine 1. Here, note that as mentioned above, in this embodiment, during the operation of the internal combustion engine 1, the ECU 10 performs a routine different from this routine, whereby the first estimated adsorption amount and the second estimated adsorption amount are estimated in a repeated manner at a predetermined operation interval.

In this routine, first in step S101, it is determined whether an execution condition for abnormality diagnosis of the SCR catalyst 51 has been satisfied. As the execution condition for abnormality diagnosis of the SCR catalyst 51, it can be exemplified that warming-up of the SCR catalyst 51 is terminated after starting of the internal combustion engine 1, and that the operating state of the internal combustion engine 1 is a steady state operation. In addition, the execution condition for abnormality diagnosis of the SCR catalyst 51 may include that after the last abnormality diagnosis of the SCR catalyst 51 was terminated, a vehicle with the internal combustion engine 1 mounted thereon has traveled a predetermined distance, or that the internal combustion engine 1 has been operated for a predetermined period of time, or the like. Here, note that these execution conditions are some examples, and in step S101, it can be determined based on well-known techniques whether the execution condition for abnormality diagnosis of the SCR catalyst 51 is satisfied. In cases where a negative determination is made in step S101, the execution of this routine is once ended. On the other hand, in cases where an affirmative determination is made in step S101, the processing of step S102 is then carried out.

In step S102, a first estimated adsorption amount Qa and a second estimated adsorption amount Qn at the current point in time, which are estimated by the execution of a routine different from this routine, are obtained. Subsequently, in step S103, the first slip development temperature Tsa is calculated based on the first estimated adsorption amount Qa at the current point in time obtained in step S102, and the second slip development temperature Tsn is calculated based on the second estimated adsorption amount Qn at the current point in time obtained in step S102. Here, note that in the ECU 10, a correlation between the first estimated adsorption amount Qa and the first slip development temperature Tsa as indicated by the solid line L1 in FIG. 3, and a correlation between the second estimated adsorption amount Qn and the second slip development temperature Tsn as indicated by the broken line L2 in FIG. 3, have each been stored in advance as a map or a function. In step S103, the first slip development temperature Tsa and the second slip development temperature Tsn are calculated by using these maps or functions.

Thereafter, in step S104, a target temperature Tt of the SCR catalyst 51 in the diagnostic temperature control is decided. At this time, the target temperature Tt is decided as a temperature which is equal to or more than the first slip development temperature Tsa calculated in step S104 and is less than the second slip development temperature Tsn calculated in step S104. Subsequently, in step S105, the diagnostic temperature control is carried out. In other words, the execution of auxiliary fuel injection in the internal combustion engine 1 is carried out. Then, by adjusting an amount of auxiliary fuel injection from the fuel injection valve 3 in the internal combustion engine 1, etc., the SCR temperature is controlled to the target temperature Tt decided in step S104.

Subsequently, in step S106, it is determined whether a detected value Ca by the ammonia sensor 55 is smaller than a concentration threshold value Cath. Here, the concentration threshold value Cath is a threshold value for determining whether ammonia has slipped from the SCR catalyst 51. In other words, when the detected value Ca by the ammonia sensor 55 becomes equal to or more than the concentration threshold value Cath, it can be judged that the slip of ammonia from the SCR catalyst 51 has occurred. This concentration threshold value Cath has been set in advance based on experiments, etc., and stored in advance in the ECU 10.

In cases where an affirmative determination is made in step S106, in other words, in cases where the slip of ammonia from the SCR catalyst 51 has not occurred, then in step S107, it is determined that the SCR catalyst 51 is normal. On the other hand, in cases where a negative determination is made in step S106, in other words, in cases where the slip of ammonia from the SCR catalyst 51 has occurred, then in step S108, it is determined that the SCR catalyst 51 is abnormal.

After the processing of Step 107 or S108, the execution of the diagnostic temperature control is terminated in step S109. In other words, the execution of auxiliary fuel injection in the internal combustion engine 1 is terminated. Here, note that in cases where in step S108 of this routine, it is diagnosed that the SCR catalyst 51 is abnormal, the user of the vehicle with the internal combustion engine 1 mounted thereon is notified of the diagnosis result.

As described above, in the present disclosure, by carrying out the diagnostic temperature control at the time of performing abnormality diagnosis of the SCR catalyst 51, it becomes possible to carry out the abnormality diagnosis of the SCR catalyst 51 irrespective of the amount of adsorption of ammonia in the SCR catalyst 51. For that reason, it is possible to ensure an opportunity for the execution of the abnormality diagnosis of the SCR catalyst 51 in an appropriate manner.

What is claimed is:

1. An abnormality diagnosis system for an exhaust gas purification apparatus which includes:
   an NOx selective reduction catalyst that is arranged in an exhaust passage of the internal combustion engine, and reduces NOx in an exhaust gas by using ammonia as a reducing agent; and
   an ammonia supply device that is arranged in the exhaust passage at the upstream side of the NOx selective reduction catalyst, and supplies ammonia to the NOx selective reduction catalyst;
   wherein the abnormality diagnosis system is applied to the exhaust gas purification apparatus; wherein
   the abnormality diagnosis system comprising:
   an ammonia sensor that detects a concentration of ammonia in the exhaust gas at the downstream side of the NOx selective reduction catalyst; and
   a controller comprising at least one processor configured to carry out an abnormality diagnosis of the NOx selective reduction catalyst, wherein
   the controller
   estimates a first estimated adsorption amount which is an amount of adsorption of ammonia in the NOx selective reduction catalyst at the time when the NOx selective reduction catalyst is assumed to be in a predetermined abnormal state;
   estimates a second estimated adsorption amount which is an amount of adsorption of ammonia in the NOx selective reduction catalyst at the time when the NOx selective reduction catalyst is assumed to be in a predetermined normal state;
   calculates, based on the first estimated adsorption amount, a first slip development temperature which is a temperature of the NOx selective reduction catalyst at which ammonia begins to slip from the NOx selective reduction catalyst in the case where the NOx selective reduction catalyst is in the predetermined abnormal state;
   calculates, based on the second estimated adsorption amount, a second slip development temperature which is a temperature of the NOx selective reduction catalyst at which ammonia begins to slip from the NOx selective reduction catalyst in the case where the NOx selective reduction catalyst is in the predetermined normal state;

carries out diagnostic temperature control to control the temperature of the NOx selective reduction catalyst to a temperature which is equal to or higher than the first slip development temperature and is less than the second slip development temperature, at the time of carrying out the abnormality diagnosis of the NOx selective reduction catalyst; and carries out the abnormality diagnosis of the NOx selective reduction catalyst based on the concentration of ammonia detected by the ammonia sensor when the diagnostic temperature control is carried out.

\* \* \* \* \*